United States Patent [19]
Teal

[11] 4,023,635
[45] * May 17, 1977

[54] SNOWMOBILE TORQUE CONVERTER CONSTRUCTION AND ARRANGEMENT

[75] Inventor: Richard Donald Teal, Horicon, Wis.

[73] Assignee: Deere & Company, Moline, Ill.

[ * ] Notice: The portion of the term of this patent subsequent to July 6, 1993, has been disclaimed.

[22] Filed: Feb. 17, 1976

[21] Appl. No.: 658,517

Related U.S. Application Data

[63] Continuation-in-part of Ser. No. 543,013, Jan. 21, 1975, Pat. No. 3,967,509.

[52] U.S. Cl. .................... 180/5 R; 74/230.17 M
[51] Int. Cl.² .................. B62M 27/02; B62M 9/08; F16H 55/52
[58] Field of Search .......... 74/230.17 A, 230.17 M, 74/230.17 E; 180/5 R, 9.64

[56] References Cited

UNITED STATES PATENTS

| | | | |
|---|---|---|---|
| 3,616,706 | 11/1971 | Shimamato | 74/230.17 M |
| 3,625,079 | 12/1971 | Hoff | 74/230.17 M |
| 3,685,366 | 8/1972 | Schupan | 74/230.17 E |
| 3,698,497 | 10/1972 | Bombardier | 74/230.17 A |
| 3,747,721 | 7/1973 | Hoff | 74/230.17 M |
| 3,842,637 | 10/1974 | Wilson | 74/230.17 M |
| 3,884,316 | 5/1975 | Bowers | 74/230.17 M |
| 3,967,509 | 7/1976 | Teal | 74/230.17 M |

Primary Examiner—Samuel Scott
Assistant Examiner—Allan R. Burke

[57] ABSTRACT

A variable speed snowmobile transmission includes a torque converter defined by primary and secondary pulleys connected together by a drive belt. The primary pulley includes an axially fixed pulley half located inboard of an axially shiftable pulley half and a speed sensitive mechanism; and the secondary pulley includes an axially shiftable pulley half located inboard of an axially fixed pulley half and a torque sensing mechanism.

4 Claims, 7 Drawing Figures

SNOWMOBILE TORQUE CONVERTER CONSTRUCTION AND ARRANGEMENT

BACKGROUND OF THE INVENTION

The present application is a continuation-in-part of application, Ser. No. 543,013, now U.S. Pat. No. 3,967,509 entitled *Variable Speed Secondary Pulley* and filed on 21 Jan. 1975 by Richard D. Teal, the applicant named herein.

The present invention relates to a snowmobile torque converter construction and arrangement.

It is common practice to provide snowmobiles with a variable speed transmission including a torque converter comprising a speed sensitive primary pulley coupled to a torque sensitive secondary pulley by means of a drive or power transmission belt. These pulleys each include an axially fixed pulley half and an axially shiftable pulley half, and in order to maintain proper alignment of the drive belt, one of the pulleys is arranged such that its fixed pulley half is inboard of its shiftable pulley half while the other of the pulleys is arranged such that its fixed pulley half is outboard of its shiftable pulley half. Further, these primary and secondary pulleys have heretofore been constructed so as to respectively have speed and torque sensitive elements or mechanisms located on the same side of the fixed pulley halves that the shiftable pulley halves are located.

An example of a torque converter arrangement wherein the speed sensitive elements of the primary pulley are located outboard of the fixed pulley half and the torque sensitive elements of the secondary pulley are located inboard of the fixed pulley half is disclosed in U.S. Pat. No. 3,685,366 issued to F. A. Schupan on 22 Aug. 1972 and entitled *Racing Centrifugal Clutch Assembly;* and an example of a torque converter arrangement wherein the speed sensitive elements of the primary pulley are located inboard of the fixed pulley half and the torque sensitive elements of the secondary pulley are located outboard of the fixed pulley half is disclosed in U.S. Pat. No. 3,698,497 issued to Jerome Bombardier on 17 Oct. 1972 and entitled *Variable Speed Transmission System and Braking Means.*

It is common practice to provide manual adjustment in the speed and torque sensitive mechanisms of snowmobile torque converters. However, since other components such as the engine, gas tank, carburetor and etc. are normally located in the same enclosure that houses the primary and secondary pulleys, to adjust or service inboard-located ones of these mechanisms often requires that the pulleys of which they form a part be completely removed from the snowmobile.

Also, there exists the danger that an operator attempting to adjust or service inboard-located ones of these mechanisms in place on the snowmobile, may come into contact with hot engine or exhaust components.

Further, the components sharing space with the primary and secondary pulleys necessarily have to be arranged as dictated by the requirement that one of the speed and torque sensing mechanisms be disposed inboard while the other is disposed outboard and these arrangements are often not as compact or as operationally desirable as arrangements that might be made if the speed and torque sensing mechanisms could both be disposed outboard.

SUMMARY OF THE INVENTION

According to the present invention there is provided a novel torque converter construction and arrangement.

A broad object of the invention is to provide a snowmobile torque converter so constructed and arranged that the speed and torque sensitive mechanisms respectively of the primary and secondary pulleys thereof are located for easy manual adjustment and/or service.

A more specific object is to provide a torque converter, as described in the immediately preceeding paragraph, wherein the speed and torque sensitive mechanisms are both located outboard.

Yet another object is to provide a novel secondary pulley in combination with a conventional primary pulley, the secondary pulley including a fixed pulley half located between an axially shiftable pulley half and an axially shiftable abutment or cam member to which the shiftable pulley half is connected for movement in unison; and the fixed pulley half and the abutment member having cooperating surfaces forming a torque sensing mechanism.

These and other objects will become apparent from a reading of the ensuing description in conjunction with the appended drawings.

DESCRIPTION OF THE PREFERRED EMBODIMENT

Figure 1:
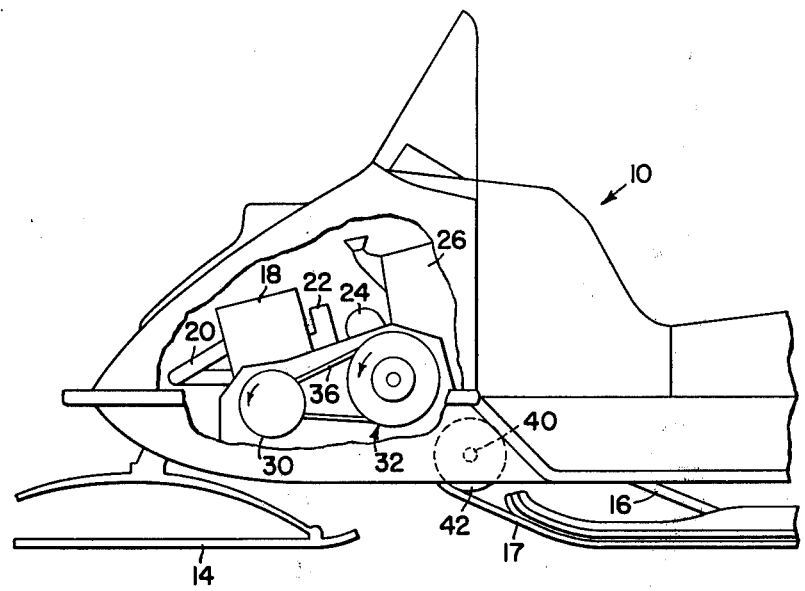
FIG. 1 is a schematic left side view of a snowmobile with parts removed and broken away so as to expose a transmission embodying a torque converter constructed and arranged according to principles of the present invention.
Figure 2:
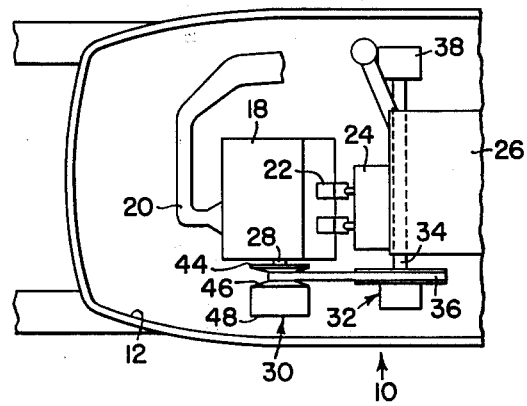
FIG. 2 is a top view of a portion of the snowmobile shown in FIG. 1.
Figure 3:
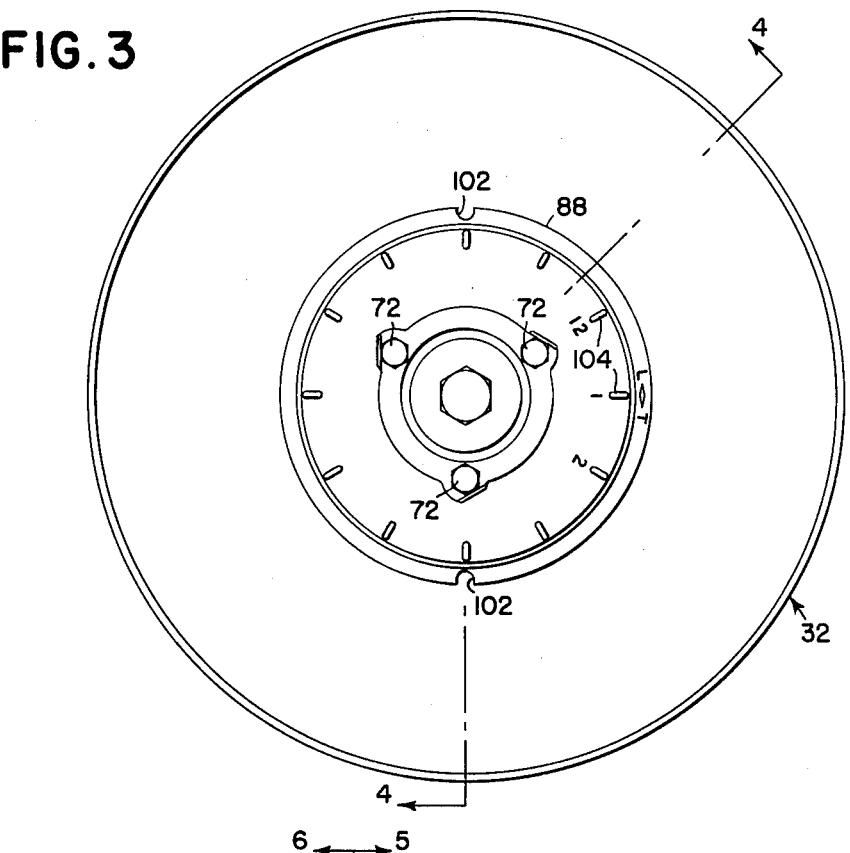
FIG. 3 is a left end view of the secondary pulley as it appears in FIG. 1.

Referring now to FIGS. 1 and 2, therein is shown a snowmobile indicated in its entirety by the reference numeral 10. The snowmobile 10 includes a longitudinally extending frame or body 12 supported on a pair of forwardly located skiis 14 and on a rearwardly located track assembly including a suspension 16 and an endless drive track 17. An engine compartment, normally covered by a hood (not shown) is located at the forward end of the snowmobile 10 and contains an internal combustion engine 18 to the forward and rearward sides of which are respectively connected an exhaust pipe 20 and a carburetor 22. Located just behind and coupled to the carburetor 22 is an intake silencer 24 and just behind the latter is a fuel tank 26.

A transmission is connected between a horizontal drive shaft 28, projecting from the left side of the engine 18, and the drive track 17. The transmission includes a speed sensitive variable speed primary pulley 30 mounted on the shaft 28 and a torque sensitive variable speed secondary pulley 32 mounted on a driven countershaft 34 journally mounted on the frame 12 in parallelism with the shaft 28. An endless drive belt 36 is trained about the pulleys 30 and 32 and cooperates therewith to thus define a torque converter. Located at the right side of the snowmobile is a chain case which houses a chain drive (not shown) which may be of any known type such as that disclosed in U.S. Pat. No. 3,673,884, granted to Southiere on 4 July 1972. The input to the chain drive is the shaft 34 while the output of the chain drive is a cross shaft 40 on which is mounted a pair of drive sprockets 42 (only one shown) that are drivingly engaged with the drive track 17.

While the snowmobile transmission represented here includes a chain case, it is to be understood that the invention is equally useable in direct drive transmissions such as that disclosed in the above-mentioned U.S. Pat. No. 3,698,497.

The primary pulley 30 is mounted so that a fixed pulley half 44 thereof is inboard of an axially movable pulley half 46 having a housing 48 secured thereto for movement therewith and enclosing a conventional speed sensing mechanism for shifting the pulley half 46 toward the fixed pulley half 44 in increasing amounts in response to increasing rotational speed of the drive shaft 28. One such speed sensing mechanism is shown in U.S. Pat. No. 3,727,478 granted to Erickson et al. on 17 Apr. 1973.

As can best be seen in FIGS. 3–6, the secondary pulley 32 includes a tubular sleeve 50 provided internally with a keyway 52 which receives a piece of key stock (not shown) to hold the sleeve 50 fixed on the driven shaft 34 to thereby form a shaft means. A first pulley half 54 includes a hub portion 56 mounted, through means of a bearing 58 for rotation on and axial movement along an inboard portion of the sleeve 50, as considered when installed as in FIG. 2. Axially adjacent to the first pulley half 54 is a second pulley half 60 including a hub portion 62 immovably fixed on the sleeve 50. A hub-like abutment member 64 is mounted through means of a bearing 66, for rotation on and axial movement along an outboard portion of the sleeve 50. The abutment member 64 is connected to the hub portion 56 of the pulley half 54 for movement with the latter by three equiangularly spaced posts 68, the latter passing through respective arcuate openings or holes 70 extending axially through the hub portion 62 of the second pulley half 60. First ends of the posts 68 are fixedly secured to the hub portion 56 preferably by being placed in a mold for making the hub portion 56 so as to become an integral part of the casting when the hub portion 56 is cast. Second ends of the posts 68 are respectively fixedly held in receptacles formed in the abutment member 64 by means of cap screws 72.

The hub portion 62 of the pulley half 60 is provided with three equiangularly spaced projections 74 which extend axially toward the abutment member 64 and are each provided at their ends with a low friction wear resistant insert 76 having an inclined surface 78 engaged with a respective complementary inclined generally helical ramp or cam surface 80 located on each of three projections 82 of the abutment member 64 extending axially toward the hub portion 60.

Figure 4:
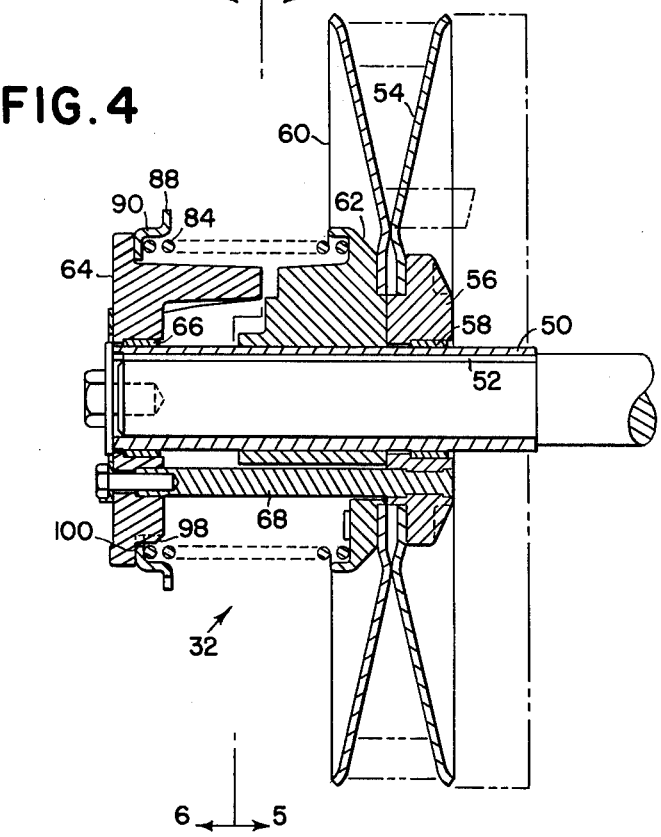
FIG. 4 is a longitudinal sectional view of the secondary pulley taken along the line 4—4 of FIG. 3.
Figure 5:
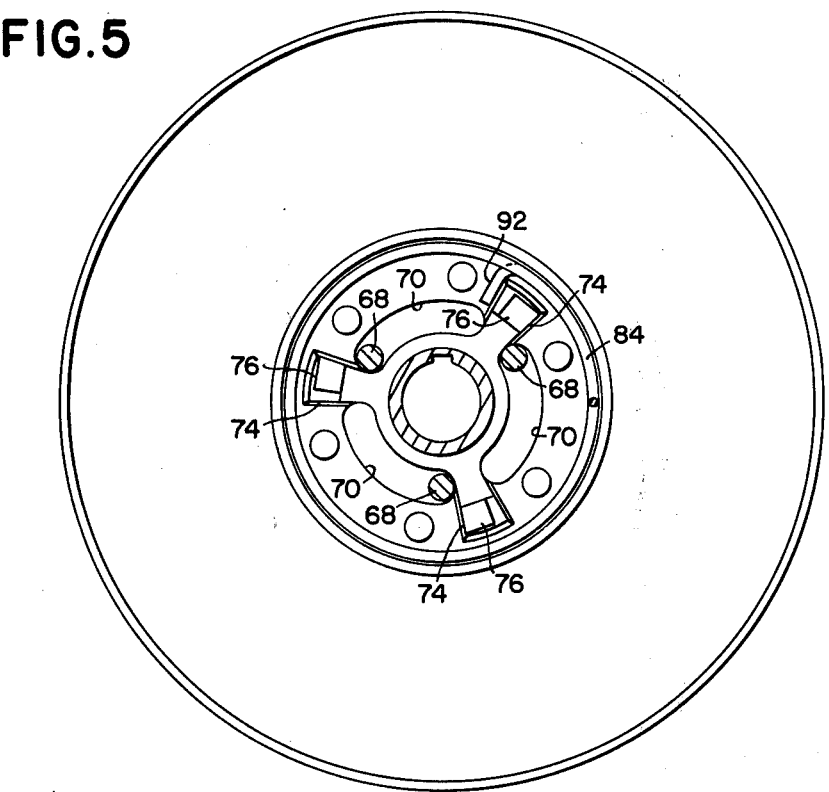
FIG. 5 is a transverse sectional view of the secondary pulley taken along line 5—5 of FIG. 4.
Figure 7:
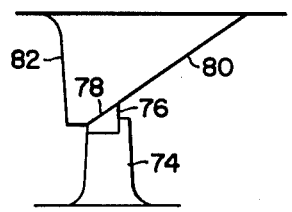
FIG. 7 is an enlarged view showing one of the projections of the fixed pulley half of the secondary pulley engaged with one of the ramp surfaces of the abutment member.
Figure 6:
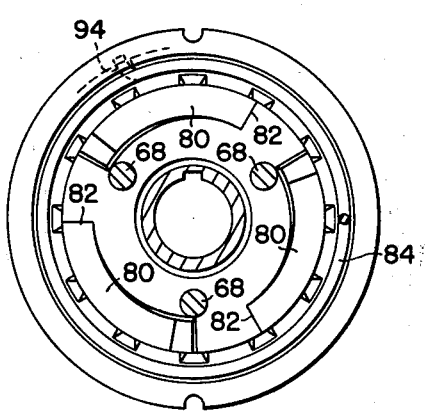
FIG. 6 is a transverse sectional view of the secondary pulley taken along line 6—6 of FIG. 4.

Provided for biasing the inclined surfaces 76 and 80, respectively of the projections 74 and 82, together and for biasing the pulley half 54 towards engagement with the fixed pulley half 60, as shown in FIG. 4, is a coil compression spring 84 mounted so as to act both in compression and torsion between the pulley half 60 and abutment member 64. Specifically, the spring 84 is mounted so as to surround the projections 74 and 82 and has its opposite ends respectively in engagement with the bottom of an annular recess formed in the hub portion 62 so as to open axially toward the abutment member 64, and with a circular indexing plate 88, which is in turn engaged with an annular shoulder or stop surface 90 formed on the abutment member 64. The spring 84 may be selectively adjusted so as to provide a desired torsional preload urging the inclined surfaces 78 against the ramp surface 80 and for this purpose a first terminal end 92 of a wire forming the spring 84 is bent radially inwardly alongside one of the projections 74 of the fixed pulley half 60 while a second terminal end 94 of the wire is bent radially outwardly and extends through an aperture provided in an axially extending flange or rim portion 96 of the indexing plate 88. Also, the plate 88 is normally prevented from rotating about the abutment member 64 by means of a plurality of splines 98 (only one shown) equiangularly arranged about the abutment member 64 and received in complementary notches 100 located in the plate 88. As can best be seen in FIG. 4, the splines 98 extend axially toward the pulley half 60 only a short distance from the shoulder 90. This permits the torsional preload of the spring 84 to be adjusted by fitting a special tool to notches 102, provided in an outer rim of the plate 88, and moving the plate axially beyond the splines 98 and rotating the plate 88 clockwise (FIG. 3) to increase the load or counterclockwise to decrease the load. Once the plate 88 is in that angular position which corresponds to the desired preload, it is permitted to move back against the shoulder 90 where it once again is restrained from rotation by the splines 98. Appropriate indicia is provided, as at 104, on the abutment member 64 and indexing plate 88 so as to aid in making the desired adjustment.

The operation of the snowmobile transmission and particularly of the secondary pulley 32 is as follows, it being noted that the operation of the primary pulley 30 may be assumed to be the same as that of the primary pulley disclosed in the aforementioned U.S. Pat. No. 3,727,478.

When the snowmobile engine 18 is idling, the shaft 28 rotates at a speed insufficient to activate the unshown speed responsive elements of the primary pulley 30 and the pulley halves 44 and 46 are held fully apart by the compressive resistance of an unshown spring of the pulley 30 such that the belt 36 rides loosely at radially inner portions of the opposed faces of the pulley halves 44 and 46. With the belt loose, no force is transferred thereby to the secondary pulley 32 and the pulley halves 54 and 60 thereof are held fully closed by the unopposed action of the spring 84 so that the belt 36 loosely engages radially outer portions of the opposed faces of the pulley halves 54 and 60. It is to be herenoted that the spring 84 is interposed between the hub 62 of the fixed pulley half 60 and the abutment member 64 such as to offer a compressive resistance to the movement of the member 64 towards the pulley half 60 and hence, of the slidable pulley half 54 away from the pulley half 60; and that the spring 84 is torsionally preloaded between the hub 62 and the member 64 such as to force the cam surfaces 80 against the inclined surfaces 78 thereby resulting in an axial component of force also resisting movement of the member 64, towards the hub 62.

As the engine 18 is speeded up, the unshown speed sensitive elements of the primary pulley 30 react to move the pulley half 46 towards the pulley half 44 against the bias of the spring of the pulley 30. This movement of the pulley half 46 results in the belt 36 being wedged radially outwardly on the opposed faces of the pulley halves 44 and 46 and being thereby tensioned and pulled radially inwardly on the opposed faces of the pulley halves 54 and 60 of the secondary pulley 32 so as to force the pulley half 54 away from the pulley half 60 initially in opposition only to the resistive action of the spring 84 but instantaneously thereafter also in opposition to the axial thrust developed at the interfaces of the cam surfaces 80 and the surfaces 76 due to the increased frictional engagement of the belt 36 with the face of the movable pulley half 54 and the resulting increase in the torque delivered to the abutment member 64, via the posts 68. Thus the belt 36 is gripped tighter and tighter by the pulleys 30 and 32 until the force delivered by the belt 36 to the pulley 32 is sufficient to overcome the torque resistance offered by the shaft 34, which resistance incidentally is quite high when the track 17 is at rest. At this time, the transmission will be in a low speed high torque delivery condition with the belt 36 positioned inwardly on the primary pulley 30 and outwardly on the secondary pulley 32, as illustrated in FIGS. 1 and 2.

Once the track 17 begins to rotate, the torque resistance offered by the shaft 34 will decrease resulting in a decrease in the axial thrust developed at the interfaces of the cam surfaces 80 and the surfaces 78 and hence, a decrease in the force resisting movement of the pulley half 54 away from the pulley half 60. Instantaneous with this decrease in force, the belt tension will force the pulley half 54 away from the pulley half 60 which results in the pulley half 54 also being rotated opposite to the driving force of and slipped upon the belt 36 by the action of the cam surfaces 80 moving on the surfaces 78 as the member 64 moves toward the hub 62.

Thus, it will be appreciated that the action of the speed responsive elements of the primary pulley 30 and the action of the torque responsive surfaces 78 and 80 of the secondary pulley 32 work against each other through the medium of the belt 36 so as to continuously effect an equilibrium condition in the transmission and that the drive ratio of the transmission is thus continuously and infinitely varied in response to these two actions to produce a drive ratio suited to the existing operation conditions.

It is herenoted that the bearings 58 and 66 which support the pulley half 54 and abutment member 64 for unitary axial and rotational movements are separated by a distance virtually equal to the axial dimension of the pulley 32. The bearings 58 and 66 thus define a bearing assembly having a length/diameter ratio, which is approximately two to two and one-half times greater than that of conventional secondary pulleys. The significance of this fact is that bearing wear life is directly related to the length/diameter ratio thereof.

Also, it will be appreciated from an inspection of FIG. 2 that the secondary pulley 32 may be mounted closely adjacent other components in the engine compartment, the only limitation being that there be sufficient clearance for the pulley half 54 to move between its extreme outboard and inboard positions respectively shown in solid and broken lines in FIG. 4.

Further, it is to be noted that the indexing plate 88 is located at an outboard location which is easily accessible to an operator thereby making it quite convenient for the torsional preload of the spring 84 to be modified by engaging a tool in the notches 102 provided in the plate 88 and then moving the plate 88 against the spring 84 a distance sufficient to clear the splines 98. Once the plate 88 is free of the splines 98, the tool is used to rotate the plate 88 either clockwise or counterclockwise, as viewed in FIG. 3, to respectively increase or decrease the torsional load. When positioned in the desired new angular position, the plate 88 is allowed to be moved by the spring 84 to again engage the splines 98.

Additionally, it is herenoted that the outboard positions of the pulleys 30 and 32 permit the operator to service or make adjustments to the pulleys without fear of coming into contact with hot components.

I claim:

1. In a snowmobile including an engine having a straight crankshaft portion extending from one side thereof and drivingly connected to an endless traction belt by a transmission including a torque converter defined by variable speed primary and secondary pulleys respectively mounted on the crankshaft portion and a shaft extending parallel to the crankshaft portion and interconnected by a drive belt, and the primary pulley having an axially fixed pulley half located adjacent to and inboard of an axially shiftable pulley half which forms part of a housing adapted to contain a speed sensitive mechanism, the improvement comprising: said secondary pulley having an axially shiftable pulley half located adjacent to and inboard of an axially fixed pulley half and having an axially shiftable abutment member located adjacent to and outboard of the axially fixed pulley half; connecting means joining the shiftable pulley half with the abutment member; biasing means interposed between the fixed pulley half and the abutment member for urging the abutment member away from the fixed pulley half; and said fixed pulley half and abutment member having cooperating surface means forming part of torque sensitive means acting to transform a component of the torque into an axial thrust which increases in a direction tending to separate the abutment member and fixed pulley half as the torque resistance of the shaft increases.

2. The snowmobile defined in claim 1 wherein said biasing means is a coil compression spring having its opposite ends respectively fixed to the fixed pulley half and to an indexing means mounted on said abutment member for angular movement about the shaft to thereby effect a torsional load adjustment of the spring by adjusting the relative angular positions of the opposite ends of the spring; and said abutment member and said indexing means mounted on said abutment member for angular movement about the shaft to thereby effect a torsional load adjustment of the spring by adjusting the relative angular positions of the opposite ends of the spring; and said abutment member and said indexing means having cooperating connection means for releasably holding the indexing means in desired angular positions.

3. The secondary pulley defined in claim 2 wherein said abutment member is provided with stop surface means facing said spring and spline means extending axially from the stop surface means a preselected distance towards the fixed pulley half; said indexing means including an annular plate provided with indexing notches normally received on the spline means to prevent rotation of the plate on the abutment member, the plate being movable axially against the force of the spring a distance sufficient to clear the spline means to thus permit rotation of the plate so as to adjust the preset torsional load in the spring to a new value, the plate then being permitted to move against the stop surface with the indexing notches thereof received on the spline means to thus hold the plate in its new angular position.

4. The secondary pulley defined in claim 1 wherein said connecting means includes a plurality of equiangularly spaced posts extending axially from the abutment member to the shiftable pulley half.

* * * * *